(12) United States Patent
Jung et al.

(10) Patent No.: US 9,360,980 B2
(45) Date of Patent: Jun. 7, 2016

(54) DISPLAY PANEL, DISPLAY DEVICE HAVING A DISPLAY PANEL AND METHOD OF MANUFACTURING A DISPLAY DEVICE HAVING A DISPLAY PANEL

(71) Applicant: Samsung Display Co., Ltd., Yongin, Gyeonggi-Do (KR)

(72) Inventors: Woo-Suk Jung, Cheonan-si (KR); Tae-Eun Kim, Busan (KR); Hye-Jung Park, Cheonan-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 63 days.

(21) Appl. No.: 14/510,502

(22) Filed: Oct. 9, 2014

(65) Prior Publication Data

US 2015/0103273 A1    Apr. 16, 2015

(30) Foreign Application Priority Data

Oct. 11, 2013 (KR) .......................... 10-2013-0121116

(51) Int. Cl.
*G02F 1/1335* (2006.01)
*G06F 3/044* (2006.01)
*G06F 3/041* (2006.01)

(52) U.S. Cl.
CPC .............. *G06F 3/044* (2013.01); *G06F 3/0412* (2013.01); *G06F 2203/04103* (2013.01)

(58) Field of Classification Search
CPC .......... G02F 1/13338; G02F 1/133528; G02F 1/133536; G02F 2001/13312; G06F 3/0412; G06F 3/045; G06F 3/044; G02B 5/3033

USPC ........................................................ 349/12, 96
See application file for complete search history.

(56) References Cited

U.S. PATENT DOCUMENTS

| | | |
|---|---|---|
| 2012/0062485 A1 | 3/2012 | Kim |
| 2012/0147299 A1* | 6/2012 | Park ................. G02F 1/133528 349/96 |
| 2015/0177876 A1* | 6/2015 | Ishii ........................ G06F 3/044 345/174 |

FOREIGN PATENT DOCUMENTS

| | | |
|---|---|---|
| KR | 10-2008-0073559 A | 8/2008 |
| KR | 10-2012-0029008 A | 3/2012 |
| KR | 10-2012-0066443 A | 6/2012 |
| KR | 10-2013-0037601 A | 4/2013 |

* cited by examiner

*Primary Examiner* — Mike Qi
(74) *Attorney, Agent, or Firm* — Knobbe Martens Olson & Bear LLP (57) ABSTRACT

A display device and panel and manufacturing method with improved outdoor visibility and fewer defects caused by heat and chemicals used in manufacturing processes are disclosed. One inventive aspect includes a first substrate having light emitting structures, a second substrate formed on a first substrate, a touch sensing structure formed in a display region of a second substrate, a touch sensing structure control circuit unit and a polarization member. The polarization member is formed on the touch sensing structure and includes a circular polarization layer. The slow axis of the circular polarization layer is substantially perpendicular to a direction in which a polarization member and a touch sensing structure control circuit unit are arranged.

20 Claims, 7 Drawing Sheets

DISPLAY PANEL, DISPLAY DEVICE HAVING A DISPLAY PANEL AND METHOD OF MANUFACTURING A DISPLAY DEVICE HAVING A DISPLAY PANEL

CROSS-REFERENCE TO RELATED APPLICATIONS

This application claims priority under 35 USC §119 to Korean Patent Applications No. 10-2013-0121116, filed on Oct. 11, 2013 in the Korean Intellectual Property Office (KIPO), the contents of which are incorporated herein in its entirety by reference.

BACKGROUND

1. Field

The disclosed technology relate generally to a display device and panel and manufacturing method with improved outdoor visibility and fewer defects caused by heat and chemicals used in manufacturing processes.

2. Description of the Related Technology

Recently, flat panel display (FPD) devices have been commercialized since they have some advantages such as light weight, small volume, etc. Such FPD devices have been developed as the output devices for clearly displaying images as well as the input device for receiving touch inputs by a user.

Additionally, the outdoor visibility of a mobile device's display panel has become more and more important for performing input/output operations, because the display panel needs to be seen clearly in outdoor activities under many external lighting conditions. However, external incident light reflected by the surface of a display panel may reduce or degraded the outdoor visibility. Thus, it has been suggested that a polarizer may be formed on the display panel to block the reflected light.

However, the polarizer can degrade from conducted heat emitting from a circuit for controlling a touch sensing structure. In this case, chemicals used in subsequent manufacturing processes can permeate through the damaged polarizer. This may cause failure of the display panel.

SUMMARY OF CERTAIN INVENTIVE ASPECTS

Various exemplary embodiments include a display panel capable of improving outdoor visibility by blocking reflected light and minimizing influence caused by conducted heat from attachment of a circuit for controlling a touch sensing structure.

Exemplary embodiments include a display device including the display panel.

Exemplary embodiments include a method of manufacturing a display device including the display panel capable of improving outdoor visibility by blocking reflected light and minimizing influence caused by conducted heat from attachment of a circuit for controlling a touch sensing structure.

According to one aspect of the disclosed technology, there is disclosed a display panel that may include a first substrate having light emitting structures, a second substrate formed on the first substrate, a touch sensing structure formed in a display region of the second substrate, a touch sensing structure control circuit unit formed in a peripheral circuit region of the second substrate, and a polarization member formed on the touch sensing structure. The polarization member may have a circular polarization layer. A slow axis of the circular polarization layer may be substantially perpendicular to a direction in which the polarization member and the touch sensing structure control circuit unit may be arranged.

In some exemplary embodiments, the touch sensing structure includes a plurality of first touch sensing electrodes arranged substantially parallel to one another, and a plurality of second touch sensing electrodes arranged along a direction substantially perpendicular to the first touch sensing electrodes.

In some exemplary embodiments, the touch sensing structure control circuit unit includes a film formed on the second substrate, and a touch control circuit formed on the film.

In one exemplary implementation, the touch sensing structure control circuit unit is configue to determine a location of a touch input at least partially based on signals from the touch sensing structure.

In some exemplary embodiments, the polarization member additionally includes a linear polarization layer formed on the circular polarization layer. The linear polarization layer may have an absorption axis inclined relative to the slow axis by an angle of about 45 degrees.

In some exemplary embodiments, the linear polarization layer absorbs an incident light along a direction substantially parallel to the absorption axis. The circular polarization layer may allow a first portion of a light passed through the linear polarization layer to pass the circular polarization layer, and may allow a phase of a second portion of the light perpendicular to the first portion to be delayed by about 90 degrees, so that the circular polarization layer absorbs a light reflected from a surface of the first substrate or a surface the second substrate.

In some exemplary embodiments, the display panel additionally includes a driving circuit unit formed on the first substrate.

In one exemplary implementation, the driving circuit unit provides a driving signal at least to one of the light emitting structures.

In some exemplary embodiments, the display panel additionally includes a third substrate formed on the polarization member, and an index matching member formed between the polarization member and the third substrate. The index matching member may match indices of the polarization member and the third substrate. In one exemplary implementation, the index matching member includes a resin or an optically clear adhesive (OCA).

In one exemplary implementation, the third substrate prevents impurities or foreign substances from permeating into the display panel and the third substrate protects at least one of the first substrate, the second substrate, the touch sensing structure, the touch sensing structure control circuit unit or the polarization member.

In another exemplary implementation, the first substrate comprises a material substantially same as the second substrate comprises.

According to another aspect of the disclosed technology, there is disclosed a display device including a touch-sensitive display panel. The display panel may include a first substrate having light emitting structures, a second substrate formed on the first substrate, a touch sensing structure formed in a display region of the second substrate, a touch sensing structure control circuit unit formed in a peripheral circuit region of the second substrate, and a polarization member formed on the touch sensing structure. The polarization member may include a circular polarization layer. A slow axis of the circular polarization layer may be substantially perpendicular to a direction in which the polarization member and the touch sensing structure control circuit unit may be arranged.

In exemplary embodiments, the touch sensing structure includes a plurality of first touch sensing electrodes arranged substantially parallel to one another, and a plurality of second touch sensing electrodes arranged along a direction substantially perpendicular to the first touch sensing electrodes.

In exemplary embodiments, the touch sensing structure control circuit unit includes a film formed on the second substrate, and a touch control circuit formed on the film.

In exemplary embodiments, the polarization member additionally includes a linear polarization layer formed on the circular polarization layer. The linear polarization layer may have an absorption axis inclined relative to the slow axis by an angle of about 45 degrees.

In one exemplary implementation, the linear polarization layer absorbs an incident light along a direction in parallel with the absorption axis, the circular polarization layer allows a first portion of a light passed through the linear polarization layer to pass the circular polarization layer, the circular polarization layer allows a phase of a second portion of the light to be delayed by about 90 degrees so that the circular polarization layer absorbs a light reflected from a surface of the first substrate or a surface the second substrate, and the second portion of the light is perpendicular to the first portion of the light.

In another exemplary implementation, the display panel further comprising a driving circuit unit formed on the first substrate.

In some exemplary embodiments, the display panel additionally includes a third substrate formed on the polarization member, and an index matching member formed between the polarization member and the third substrate. The index matching member may allow indices of the polarization member and the third substrate to be matched. In one exemplary implementation, the index matching member includes a resin or an optically clear adhesive.

According to still another aspect of the disclosed technology, there is disclosed a method of manufacturing a display device. In the method, light emitting structures may be formed on a first substrate. A second substrate may be included on the first substrate. A touch sensing structure may be formed in a display region of the second substrate. A polarization member including a circular polarization layer may be formed on the touch sensing structure. A touch sensing structure control circuit unit may be formed in a peripheral circuit region of the second substrate. The circular polarization layer may be elongated along a direction substantially perpendicular to a direction in which the polarization member and the touch sensing structure control circuit unit may be arranged.

In some exemplary embodiments, a driving circuit unit is additionally formed on the first substrate before forming the second substrate.

In forming of the touch sensing structure, a plurality of first touch sensing electrodes may be formed to be arranged substantially parallel to each other, and a plurality of second touch sensing electrodes may be formed to be arranged along a direction substantially perpendicular to the first touch sensing electrodes.

In forming of the polarization member, a linear polarization layer may be additionally formed on the circular polarization layer. In one exemplary implementation, the linear polarization layer has an absorption axis inclined with respect to the direction in which the circular polarization layer is elongated by an angle of 45 about degrees.

In some exemplary embodiments, an index matching member is additionally formed on the polarization member, and a third substrate may be formed on the index matching member. Here, the index matching member may be formed using a resin or an optically clear adhesive.

According to some exemplary embodiments, the display panel blocks reflected light and therefore improve outdoor visibility. It can also reduce or remove influence caused by conducted heat from the circuit attached for controlling the touch sensing structure. As a result, defects in the display panel caused by chemicals used in manufacturing processes may be reduced or prevented.

BRIEF DESCRIPTION OF THE DRAWINGS

Illustrative, some non-limiting exemplary embodiments will be more clearly understood from the following detailed description taken in conjunction with the accompanying drawings.

DETAILED DESCRIPTION OF CERTAIN INVENTIVE EMBODIMENTS

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. Rather, these exemplary embodiments are included so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

In the following description, technical terms are used only to explain a specific exemplary embodiment while not limiting the disclosed technology. The terms of a singular form may include plural forms unless referred to the contrary. The terms "include," "comprise," "including," and "comprising," as used herein, specify a component, a process, an operation, and/or an element but do not exclude other components, processes, operations, and/or elements. It will be understood that although the terms "first" and "second" are used herein to describe various elements, these elements should not be limited by these terms. These terms are only used to distinguish one component from other components.

It will be understood that when a layer, region, or component is referred to as being "formed on," another layer, region, or component, it can be directly or indirectly formed on the other layer, region, or component. That is, for example, intervening layers, regions, or components may be present.

The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the disclosed technology is not limited to the illustrated sizes and thicknesses.

In the drawings, the thickness of layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it is directly on the other element or intervening elements may also be present.

Throughout this specification and the claims that follow, when it is described that an element is "connected" to another element, the element is "directly connected" to the other element or "electrically connected" to the other element through a third element. In addition, unless explicitly described to the contrary, the word "comprise" and variations such as "comprises" or "comprising" will be understood to imply the inclusion of stated elements but not the exclusion of any other elements. Throughout this specification, it is understood that the term "on" and similar terms are used generally and are not necessarily related to a gravitational reference.

Here, when a first element is described as being connected to a second element, the first element is not only directly connected to the second element but may also be indirectly connected to the second element via a third element. Further, some of the elements that are not essential to the complete understanding of the disclosed technology are omitted for clarity. Also, like reference numerals refer to like elements throughout.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
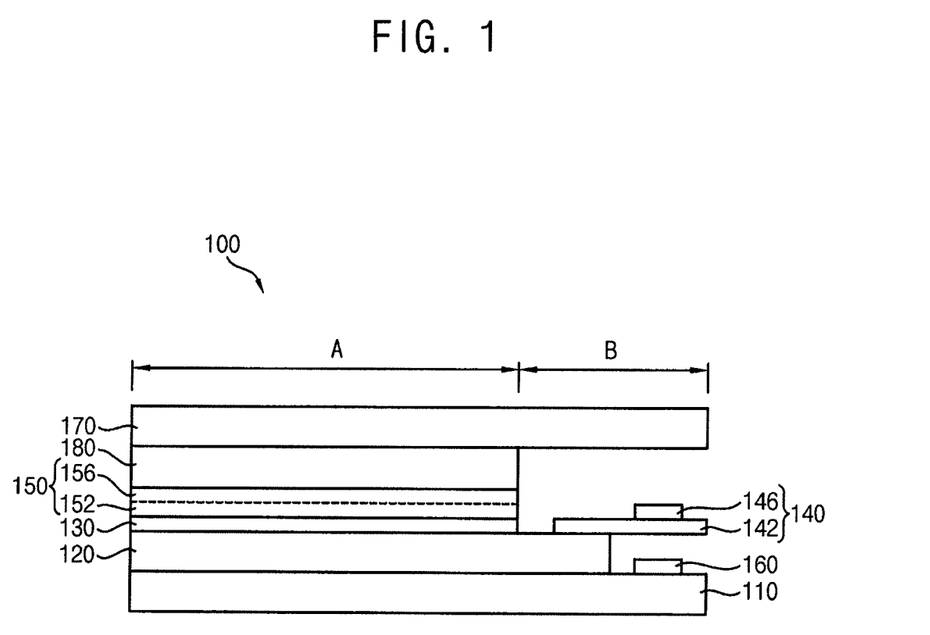
FIG. 1 is a cross sectional view illustrating a display panel in accordance with some exemplary embodiments.

FIG. 1 is a cross sectional view illustrating a display panel in accordance with some exemplary embodiments.

Referring to FIG. 1, a display panel 100 according to some exemplary embodiments is illustrated. The display panel 100 may block reflected light to improve an outdoor visibility. The display panel 100 may minimize influence caused by conducted heat generated in an attachment of a touch sensing circuit. This may reduce or prevent defects of the display panel 100 caused by chemicals used in manufacturing processes. In some exemplary embodiments, the display panel 100 includes a first substrate 110, a second substrate 120, a touch sensing structure 130, a touch sensing structure control circuit 140, a polarization member 150, etc. In some exemplary embodiments, the display panel 100 additionally includes a driving circuit unit 160, a third substrate 170, an index matching member 180, etc.

The first substrate 110 may include light emitting structures to implement display function of the display panel 100. In one exemplary implementation, in case that the display panel 100 is employed in an organic light emitting display device, the light emitting structures may include organic light emitting elements, transistors for driving the organic light emitting elements, etc. The transistors may apply currents to the organic light emitting elements. The organic light emitting elements may emit light based on recombination of holes and electrons caused by the applied current, thereby implementing the display function.

The second substrate 120 may be formed on the first substrate 110. The second substrate 120 may protect the first substrate 110 from physical impact. The second substrate 120 may implement input function of the display panel 100 together with the touch sensing structure 130. In some exemplary embodiments, the second substrate 120 includes a material substantially the same as or substantially similar to a material included in the first substrate 110. In one exemplary implementation, each of the first substrate 110 and the second substrate 120 include a substantially transparent insulation material. Alternatively, the first substrate 110 and/or the second substrate 120 may include a material having flexibility.

Referring now to FIG. 1, the touch sensing structure 130 may be formed in a display region A of the second substrate 120. The touch sensing structure 130 may sense touch input from a user to the display panel 100. In some exemplary embodiments, the touch sensing structure 130 includes a plurality of first touch sensing electrodes and a plurality of second touch sensing electrodes. The first touch sensing electrodes may be arranged substantially parallel to one another. The second touch sensing electrodes may be arranged along a direction substantially perpendicular to a direction in which the first touch sensing electrodes may be arranged.

In some exemplary embodiments, the touch sensing structure control circuit unit 140 is formed in a peripheral circuit region B of the second substrate 120. The touch sensing structure control circuit unit 140 may control the touch sensing structure 130. In one exemplary implementation, the touch sensing structure control circuit unit 140 detects whether the user touches the display panel 100 or not. The touch sensing structure control circuit unit 140 may determine a location of the touch input based on signals from the touch sensing structure 130.

In some exemplary embodiments, the touch sensing structure control circuit unit 140 includes a film 142 on glass (FOG) and a touch control circuit 146. The film 142 and the touch control circuit 146 can be formed by one process. The film 142 is connected to the second substrate 120 and the touch control circuit 146, so that a control signal generated from the touch sensing structure 130 is transferred to the touch control circuit 146. The touch control circuit 146 includes an integrated circuit (IC). The touch control circuit 146 controls the touch sensing structure 130, so that the touch control circuit 146 detects whether the display panel 100 is touched or not. The touch control circuit 146 also determines the location of the touch input by the user.

The polarization member 150 may be formed on the touch sensing structure 130. The polarization member 150 may include a circular polarization layer 152. The polarization member 150 may absorb external incident light reflected by a surface of the first substrate 110 and/or a surface of the second substrate 120. In some exemplary embodiments, the circular polarization layer 152 has a slow axis. The slow axis of the circular polarization layer 152 may be substantially perpendicular to a direction in which the polarization member 150 and the touch sensing structure control circuit unit 140 may be arranged. According to some exemplary embodiments, the polarization member 150 additionally includes a linear polarization layer 156.

The circular polarization layer 152 may allow a phase of a slow-axis portion of an incident light to be delayed by about 90 degrees (i.e. $\lambda/4$ wherein $\lambda$ is a wavelength of the incident light) The circular polarization layer 152 may also allow a portion of which direction may be substantially perpendicular to the slow axis to pass. In general, a method of forming the circular polarization layer 152 may include an elongation process. The slow axis may be substantially parallel to a direction in which the circular polarization layer 152 may be elongated.

In some exemplary embodiments, the linear polarization layer 156 absorbs a first portion of the incident light wherein a direction of the first portion may be substantially parallel to an absorption axis thereof. The linear polarization layer 156 may also allow a second portion of the incident light to pass therethrough wherein a direction of the second portion may be substantially perpendicular to the absorption axis. A method of forming the linear polarization layer 156 may include an elongation process. The absorption axis of the linear polarization layer 156 may be substantially parallel to a direction in which the linear polarization layer 156 may be elongated.

In exemplary embodiments, the diving circuit unit 160 is formed on the first substrate 110. The driving circuit unit 160 may apply a driving signal to light emitting structures formed on the first substrate 110. In one exemplary implementation, the driving circuit unit 160 applies signals required by the light emitting structures such as a scan signal, a data signal, an emission signal, etc.

In some exemplary embodiments, the third substrate 170 is formed on the polarization member 150. The third substrate 170 may prevent impurities or foreign substances from permeating into the display panel 100. The third substrate 170 may protect the first substrate 110, the second substrate 120, the touch sensing structure 130, the touch sensing structure control circuit unit 140, the polarization member 150 and/or the driving circuit unit 160 from physical impact.

The index matching member 180 may be formed between the polarization member 150 and the third substrate 170, such that the index matching member 180 may match indices of the polarization member 150 and the third substrate 170. In some exemplary embodiments, the index matching member 180 includes a resin or an optically clear adhesive (OCA). The index matching member 180 may prevent a reflection of the light caused by a difference of indices between the polarization member 150 and the third substrate 170 by means of index matching.

Figure 2A:
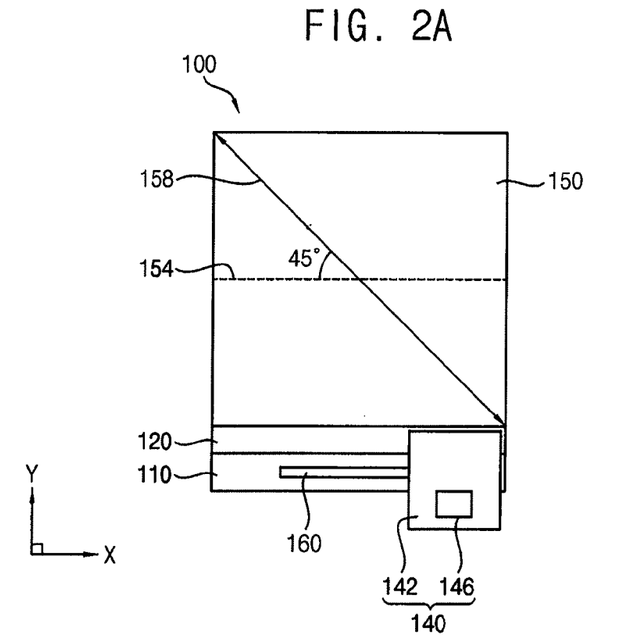
FIG. 2A is a schematic cross sectional view illustrating a slow axis of a circular polarization layer according to an exemplary embodiment, the slow axis being perpendicular to a direction in which the polarization member and the touch sensing structure control circuit unit are arranged.

FIG. 2A is a schematic cross sectional view illustrating a slow axis of a circular polarization layer according to some exemplary embodiments wherein the slow axis is substantially perpendicular to a direction in which the polarization member and the touch sensing structure control circuit unit are arranged.

Figure 2B:
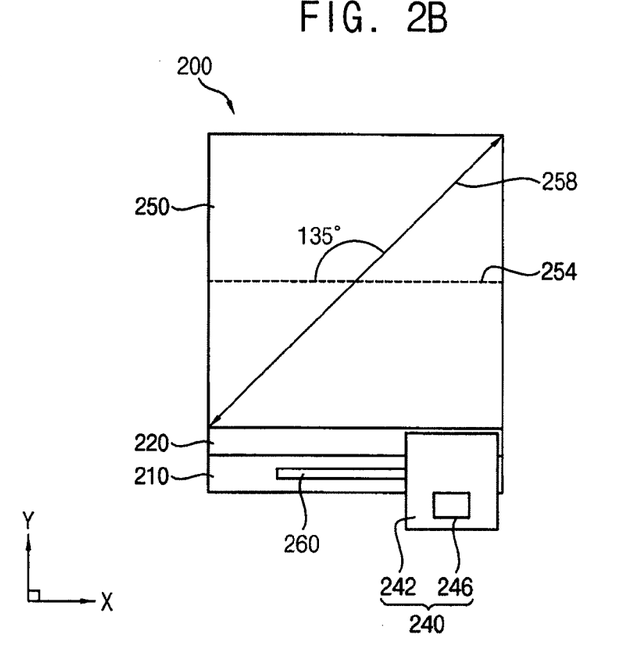
FIG. 2B is a schematic cross sectional view illustrating a slow axis of a circular polarization layer according to another exemplary embodiment, the slow axis being perpendicular to a direction in which the polarization member and the touch sensing structure control circuit unit are arranged.

FIG. 2B is a schematic cross sectional view illustrating a slow axis of a circular polarization layer according to some exemplary embodiments wherein the slow axis is substantially perpendicular to a direction in which the polarization member and the touch sensing structure control circuit unit are arranged.

FIG. 2A illustrates a cross section between the polarization member 150 and the index matching member 180 from a top view of the display panel 100 in FIG. 1. In FIG. 2A, a circular polarization layer 152 located at the bottom of the polarization member 150 and a linear polarization layer 156 located at the top of the polarization member 150 are illustrated.

Referring to FIG. 2A and FIG. 2B, each of the display panels 100 and 200 may include a first substrate 110 and 210, a second substrate 120 and 220, a touch sensing structure control circuit unit 140 and 240, a polarization member 150 and 250, etc. respectively. Each of the touch sensing structure control circuit units 140 and 240 may respectively include a film 142 and 242, a touch sensing circuit 146 and 246, etc. However, since configurations of the first substrate 110 and 210, the second substrate 120 and 220, and the touch sensing structure control circuit unit 140 and 240 are substantially the same as or substantially similar to configurations of the first substrate 110, the second substrate 120, and the touch sensing structure control circuit unit 140 in FIG. 1, descriptions for these elements will be omitted.

In some exemplary embodiments, the linear polarization layer 156 included in the polarization member 150 is formed on the circular polarization layer 152. An absorption axis 158 of the linear polarization layer 156 may be inclined relative to a slow axis 154 of the circular polarization layer 152 by an angle of about 45 degrees.

In some exemplary embodiments, a linear polarization layer included in the polarization member 250 is formed on a circular polarization layer. An absorption axis 258 of the linear polarization layer may be inclined with respect to a slow axis 254 of the circular polarization layer by an angle of about 135 degrees. In this case, since the absorption axis 258 may be inclined relative to the slow axis 254 by the angle of about 45 degrees, both the display panels 100 and 200 as illustrated in FIGS. 2A and 2B may have consequently the same effect as described below with reference to FIG. 3.

Figure 3:
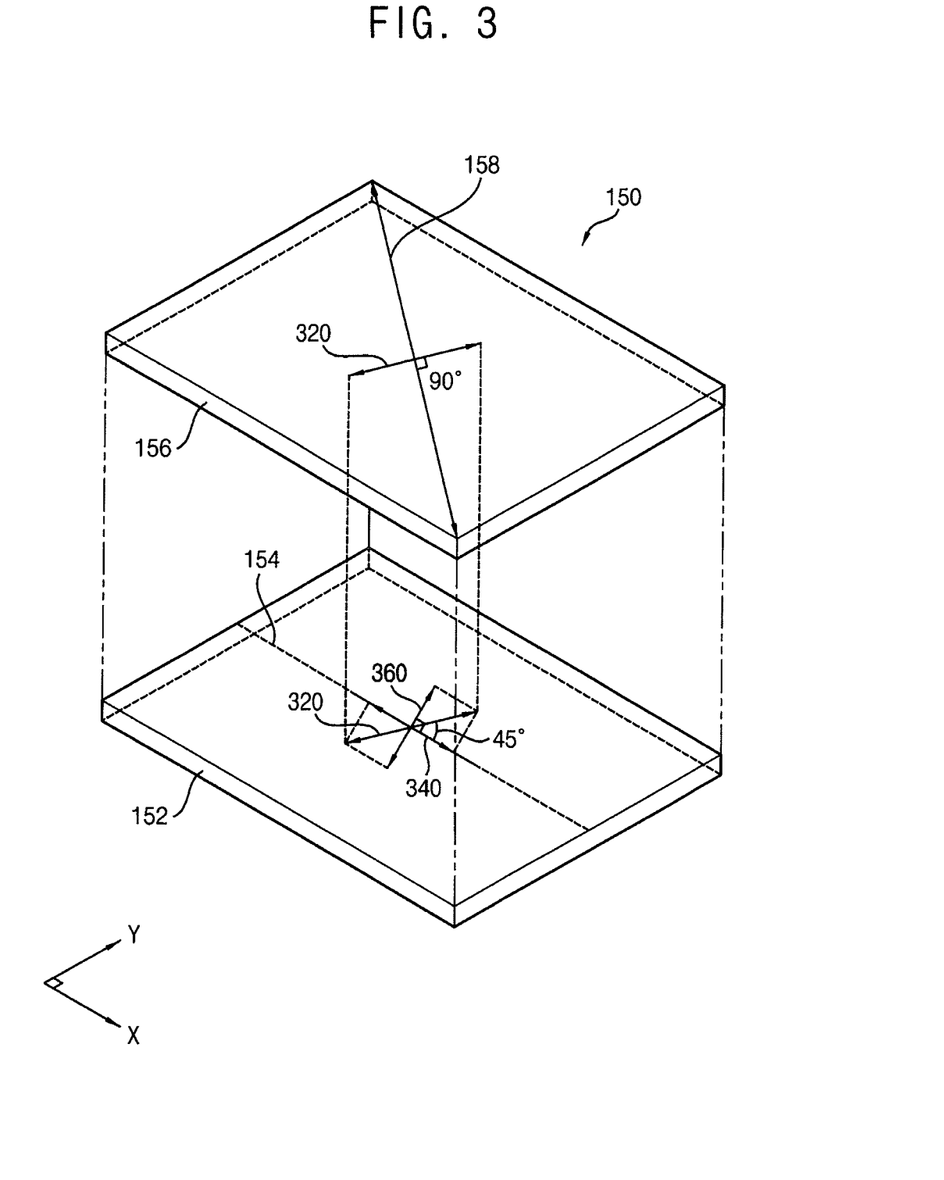
FIG. 3 is a perspective view illustrating a circular polarization layer and a linear polarization layer blocking a reflected light.

FIG. 3 is a perspective view illustrating a circular polarization layer and a linear polarization layer for blocking a reflected light.

A polarization member 150 illustrated in FIG. 3 may include a circular polarization layer 152 and a linear polarization layer 156.

In some exemplary embodiments, downwardly incident light to the polarization member 150 passes through the linear polarization layer 156. A first portion of the incident light may be absorbed by the linear polarization layer 156 wherein a direction of the first portion may be substantially parallel to a direction of the absorption axis 158. Only a second portion 320 of the incident light may pass through the linear polarization layer 156 wherein a direction of the second portion 320 may be substantially perpendicular to the direction of the absorption axis 158. As a result, light passed through the linear polarization layer 156 may be linearly polarized.

The light passed through the linear polarization layer 156 may proceed into the circular polarization layer 152. Since the absorption axis 158 is inclined relative to the slow axis 154 by the angle of about 45 degrees, the slow axis 154 may be inclined with respect to the direction of the second component 320 of the light passed through the linear polarization layer 156 by an angle of about 45 degrees. A phase of an x-axis component 340 of the second portion 320 may be delayed by about 90 degrees while the x-axis component 340 passes through the circular polarization layer 152. The x-axis may be substantially parallel to the slow axis 154. A y-axis component 360 of the second portion 320 may pass through the circular polarization layer 152 wherein the y-axis may be substantially perpendicular to the slow axis 154. As a result, a light passed through the circular polarization layer may be left-handed circularly polarized.

Light passed through the circular polarization layer 152 may be reflected by the first substrate 110 and/or the second substrate 120, so that this light may be right-handed circularly polarized. A phase of an x-axis component of the reflected light may be delayed by about 90 degrees while the reflected light passes through the circular polarization layer 152. The x-axis component may be substantially parallel to the slow axis 154. Therefore, light passed through the circular polarization layer 152 may include only a component of which direction may be substantially parallel to the absorption axis 158, such that this light may be absorbed by the linear polarization layer 156. As a result, the light reflected by the first substrate 110 and/or the second substrate 120 among the downwardly incident light to the polarization member 150 may be blocked by the polarization member 150 so as to improve outdoor visibility of the display panel 100.

In some exemplary embodiments, a downwardly incident light to the polarization member 250 is left-handed circularly polarized while the incident light passes through the polarization member 250 according to the same mechanism as described above. Light reflected by the first substrate 210 and/or the second substrate 220 may be right-handed circularly polarized. Finally, the reflected light may have only a component of which direction may be substantially parallel to the absorption axis while the reflected light passes through the circular polarization layer of the polarization member 250 according to the same mechanism as described above. As a result, the light reflected by the first substrate 210 and/or the second substrate 220 among the downwardly incident light to the polarization member 250 may be blocked by the polarization member 250, so that outdoor visibility of the display panel 200 may be improved.

Figure 4:
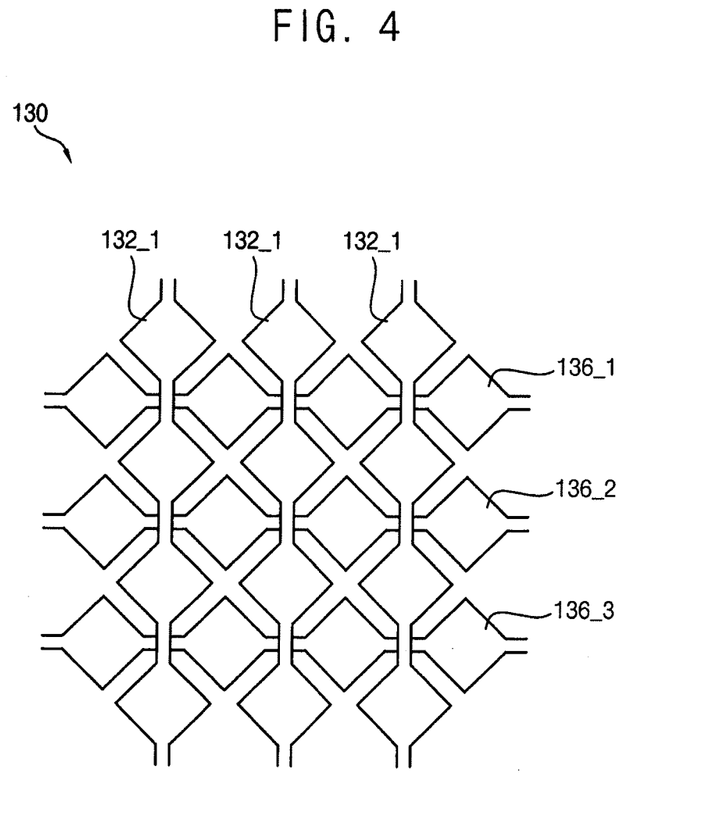
FIG. 4 is a plan view illustrating an exemplary of touch sensing electrodes included in a touch sensing structure in accordance with some exemplary embodiments.

FIG. 4 is a plan view illustrating touch sensing electrodes included in a touch sensing structure in accordance with some exemplary embodiments.

Referring to FIG. 4, a touch sensing structure 130 may include a plurality of first touch sensing electrodes 132_1, 132_2 and 132_3 arranged substantially parallel to one another, and a plurality of second touch sensing electrodes 136_1, 136_2 and 136_3 arranged along a direction substantially perpendicular to the first touch sensing electrodes 132_1, 132_2 and 132_3. The first touch sensing electrodes 132_1, 132_2 and 132_3, and the second touch sensing electrodes 136_1, 136_2 and 136_3 may convert touch input by a user into an electrical signal.

The touch sensing structure 130 may sense a variation of capacitances generated by the first touch sensing electrodes 132_1, 132_2 and 132_3, and the second touch sensing electrodes 136_1, 136_2 and 136_3, such that the variation of the capacitances may be converted into the electrical signal.

Figure 5:
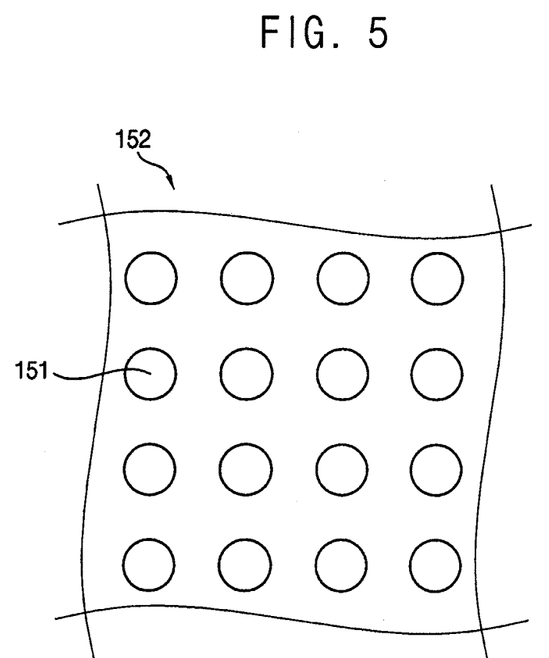
FIG. 5 is a plan view illustrating a circular polarization layer before an elongation in accordance with exemplary embodiments.

FIG. 5 is a plan view illustrating a circular polarization layer before an elongation process in accordance with some exemplary embodiments.

Figure 6A:
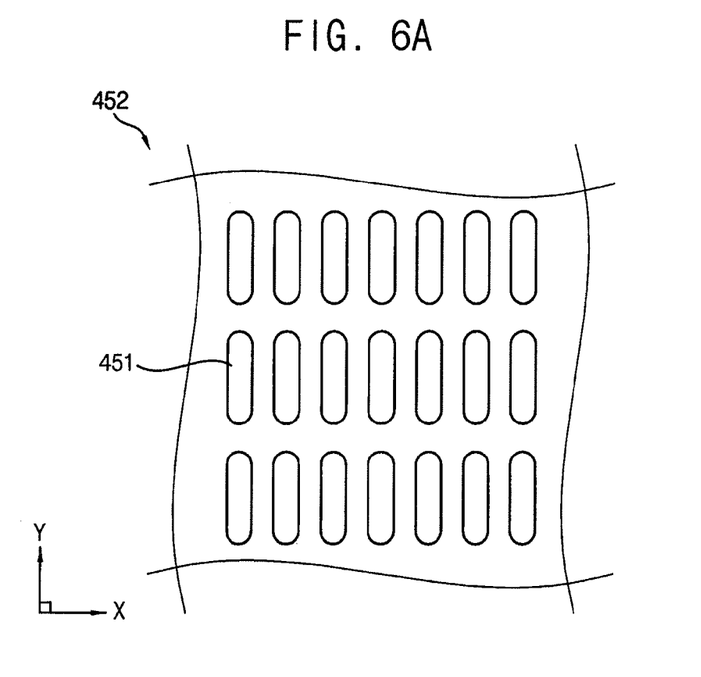
FIGS. 6A and 6B are plan views illustrating an exemplary in which a circular polarization layer after an elongation according to some exemplary embodiments minimizes effects caused by conducted heat from an attachment of a touch sensing circuit.
Figure 6B:
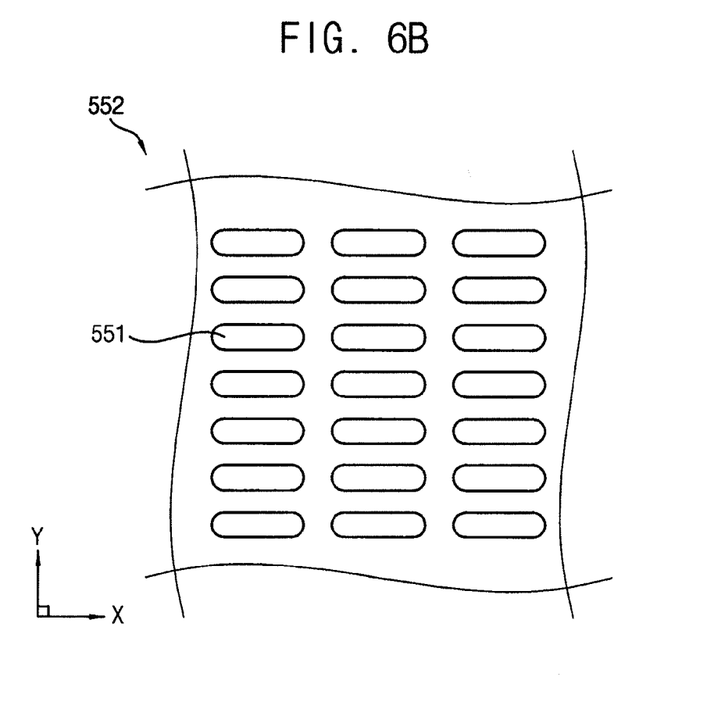

FIGS. 6A and 6B are plan views illustrating a circular polarization layer after an elongation process reducing or preventing influence caused by conducted heat generated in attachment of a touch sensing circuit.

Referring to FIG. 5, particles 151 included in a circular polarization layer 152 are illustrated. In one exemplary implementation, the particles 151 in the circular polarization layer 152 includes polyvinyl alcohol (PVA), polycarbonate (PC), etc.

FIG. 6A illustrates a circular polarization layer 452 into which the circular polarization layer 152 in FIG. 5 may be elongated along a direction substantially parallel to the y-axis. In this case, unlike as described with reference to FIG. 2A or FIG. 2B, a slow axis of the circular polarization layer 452 may be substantially parallel to a direction (i.e., y-axis) in which the polarization member and the touch sensing structure control circuit unit are arranged.

Particles 451 included in the circular polarization layer 452 may be formed into a shape that is relatively longer along the y-direction than along the x-direction, thereby forming relatively more gaps between the particles 451 into which heat or chemicals may penetrate along the y-direction. Therefore, it may be easier that conducted heat generated in attachment of a touch sensing structure control circuit unit penetrates the gaps along the y-direction. As a result, the circular polarization layer 452 in FIG. 6A may be more vulnerable to defects caused by the conducted heat compared to the circular polarization layer 552 in FIG. 6B.

FIG. 6B illustrates a circular polarization layer 552 into which the circular polarization layer 152 in FIG. 5 may be elongated along a direction substantially parallel to the x-axis. In this case, a slow axis of the circular polarization layer 552 may be substantially perpendicular to a direction (i.e., y-axis) in which the polarization member and the touch sensing structure control circuit unit are arranged.

Particles 551 included in the circular polarization layer 552 may be formed into a shape that is relatively longer along the x-direction than along the y-direction, thereby forming relatively more gaps between the particles 551 into which heat or chemicals may penetrate along the x-direction. Therefore, it may be easier that conducted heat generated in attachment of a touch sensing structure control circuit unit penetrates the gaps along the x-direction. As a result, the circular polarization layer 552 in FIG. 6B may reduce or remove influence caused by the conducted heat in the attachment of the touch sensing structure control circuit unit, thereby reducing or removing defects caused by chemicals of subsequent processes.

Figure 7:
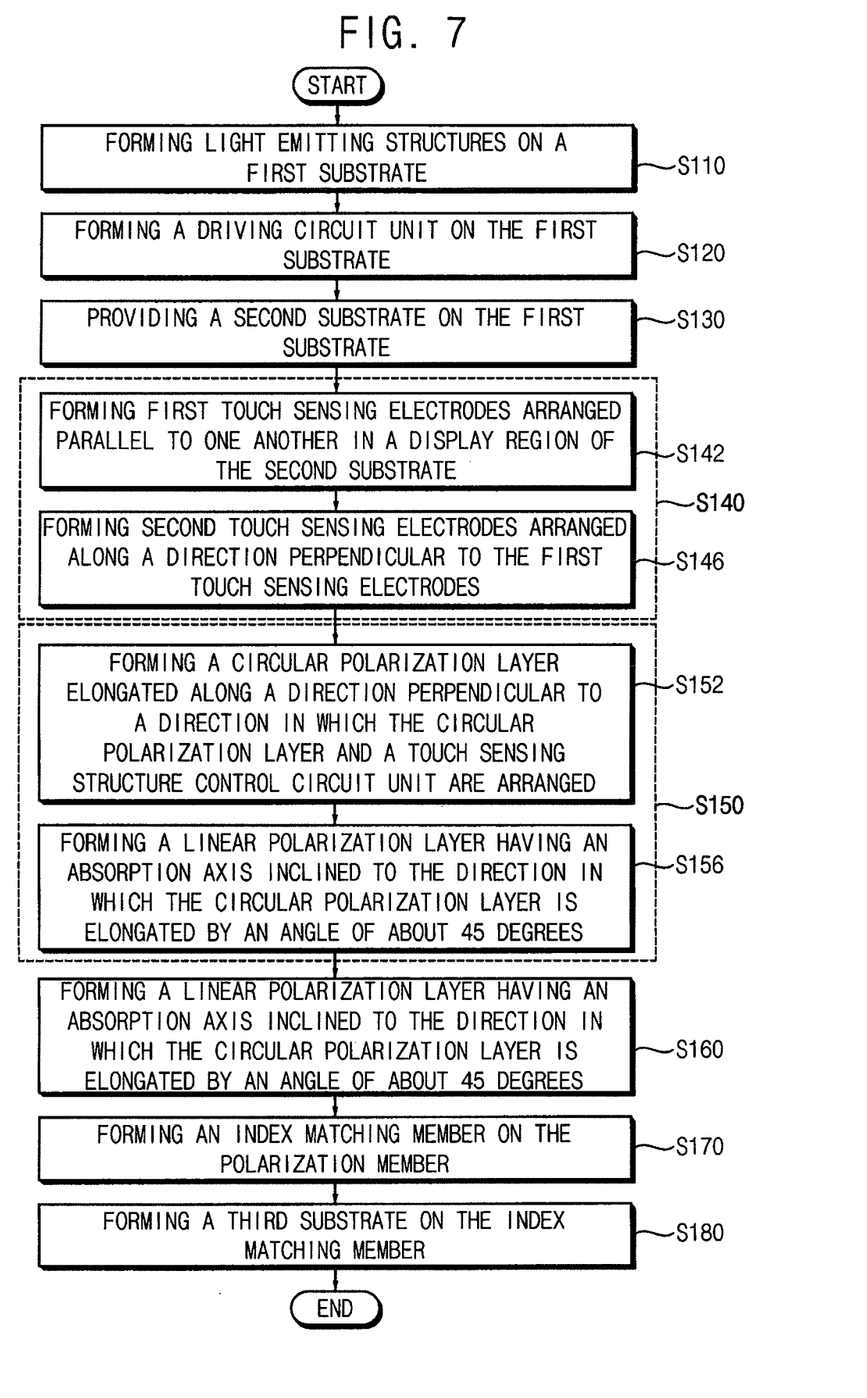
FIG. 7 is a flow chart illustrating a method of manufacturing a display device in accordance with some exemplary embodiments.

FIG. 7 is a flow chart illustrating a method of manufacturing a display device according to some exemplary embodiments.

A method of manufacturing a display device will be described with reference to FIG. 7. The display device obtained by this method may block a reflected light to improve outdoor visibility thereof. The display device obtained by this method may reduce or remove influence caused by conducted heat from attachment of a touch sensing circuit, so that defects of the display device caused by chemicals used in subsequent manufacturing processes may be reduced or prevented.

Referring to FIG. 7, light emitting structures may be formed on a first substrate in step S110, and a second substrate may be included on the first substrate in step S130. A touch sensing structure may be formed on a display region of the second substrate in step S140, and a polarization member having a circular polarization layer may be formed on the touch sensing structure in step S150. In step 152, the circular polarization layer may be elongated along a direction substantially perpendicular to a direction in which the polarization member and a touch sensing structure control circuit unit may be arranged. The touch sensing structure control circuit unit may be formed in a peripheral circuit region of the second substrate in step S160.

In some exemplary embodiments, a driving circuit unit for applying a driving signal to the first substrate is formed on the first substrate in step S120 before providing of the second substrate in step S130. In addition, an index matching member may be formed on the polarization member in step S170. A third substrate may be formed on the index matching member in step S180 after the touch sensing structure control circuit unit may be formed in step S160.

According to some exemplary embodiments, transistors, insulating layers, organic light emitting elements, etc. are formed on the first substrate in forming of the light emitting structures in step S110. In some exemplary embodiments, a driving circuit unit for applying the driving signal to the light emitting structures is formed on the first substrate in step S120.

In some exemplary embodiments, the second substrate is formed using a material that may protect the first substrate from physical impact in forming of the second substrate in step S130.

According to some exemplary embodiments, when the touch sensing structure is included in a resistive touch screen, a stable layer protecting the light emitting structures is formed, and then a conductive layer for sensing a touch input by a user may be formed on the stable layer in formation of the touch sensing structure in step S140. A top layer, which may be physically deformed by the touch input, may be formed on the stable layer. On the other hand, when the touch sensing structure is included in a capacitive touch screen, electrodes, which may generate capacitances, may be formed on the light emitting structures.

In some exemplary embodiments, a plurality of first touch sensing electrodes arranged substantially parallel to one another is formed in step S142, and a plurality of second touch sensing electrodes arranged along a direction substantially perpendicular to the first touch sensing electrodes may be formed in step S146, so the touch sensing structure may be obtained in step S140.

According to some exemplary embodiments, the polarization member is formed using polyvinyl alcohol (PVA), polycarbonate (PC), etc. while forming the polarization member in step S150. A polarization layer included in the polarization member may be formed by an elongation process.

In some exemplary embodiments, a circular polarization layer is elongated in step S152. A linear polarization layer is formed in step S156 in forming of the polarization member in step S150. A direction in which the circular polarization layer is elongated is inclined relative to an absorption axis of the linear polarization layer by an angle of about 45 degrees.

According to some exemplary embodiments, the touch sensing structure control unit is formed by attaching a film to the second substrate using heat and pressure while forming the touch sensing structure control unit in step S160. The film may include a touch control circuit.

In some exemplary embodiments, the index matching member may be formed using a material which matches indices of the polarization member and the third substrate in forming of the index matching member in step S170. The index matching member may be formed between the polarization member and the third substrate. In one exemplary implementation, the index matching member includes a resin or an optically clear adhesive.

According to formation of the third substrate in step S18, the third substrate may prevent impurities or foreign substances from permeating the display panel, and may protect the first substrate, the second substrate, the touch sensing structure, the touch sensing structure control circuit unit, the polarization member, the driving circuit unit, etc. from physical impact.

For purposes of summarizing the disclosed technology, certain aspects, advantages and novel features of the disclosed technology have been described herein. It is to be understood that not necessarily all such advantages is achieved in accordance with any particular embodiment of the disclosed technology. Thus, the disclosed technology is embodied or carried out in a manner that achieves or optimizes one advantage or group of advantages as taught herein without necessarily achieving other advantages as is taught or suggested herein.

Various modifications of the above described embodiments will be readily apparent, and the generic principles defined herein is applied to other embodiments without departing from the spirit or scope of the disclosed technology. Thus, the disclosed technology is not intended to be limited to the embodiments shown herein but is to be accorded the widest scope consistent with the principles and novel features disclosed herein.

The foregoing is illustrative of exemplary embodiments, and is not to be construed as limiting thereof. Although a few exemplary embodiments have been described, those skilled in the art will readily appreciate that many modifications are possible in the exemplary embodiments without materially departing from the novel teachings and advantages of exemplary embodiments. Accordingly, all such modifications are intended to be included within the scope of exemplary embodiments as defined in the claims. In the claims, means-plus-function clauses are intended to cover the structures described herein as performing the recited function and not only structural equivalents but also equivalent structures. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A display panel comprising:
   a first substrate including light emitting structures;
   a second substrate formed on the first substrate;
   a touch sensing structure formed in a display region of the second substrate;
   a touch sensing structure control circuit unit formed in a peripheral circuit region of the second substrate; and
   a polarization member formed on the touch sensing structure, the polarization member including a circular polarization layer, wherein the slow axis of the circular polarization layer is perpendicular to the direction in which the polarization member and the touch sensing structure control circuit unit are arranged.

2. The display panel of claim 1, wherein the touch sensing structure comprises:
   a plurality of first touch sensing electrodes arranged parallel to one another; and
   a plurality of second touch sensing electrodes arranged along a direction perpendicular to the first touch sensing electrodes.

3. The display panel of claim 1, wherein the touch sensing structure control circuit unit comprises:
   a film formed on the second substrate; and a touch control circuit formed on the film,
wherein the touch sensing structure control circuit unit is configure to determine a location of a touch input at least partially based on signals from the touch sensing structure.

4. The display panel of claim 1, wherein the polarization member further comprises a linear polarization layer formed on the circular polarization layer, the linear polarization layer having an absorption axis inclined relative to the slow axis by an angle of about 45 degrees.

5. The display panel of claim 4,
wherein the linear polarization layer absorbs an incident light along a direction in parallel with the absorption axis,
wherein the circular polarization layer allows a first portion of a light to pass the circular polarization layer, and
the circular polarization layer allows a phase of a second portion of the light to be delayed by about 90 degrees so that the circular polarization layer absorbs a light reflected from a surface of the first substrate or a surface the second substrate,
wherein the first portion of the light passes through the linear polarization layer, and
wherein the phase of the second portion of the light is perpendicular to the first portion of the light.

6. The display panel of claim 1, further comprising a driving circuit unit formed on the first substrate wherein the driving circuit unit provides a driving signal at least to one of the light emitting structures.

7. The display panel of claim 1, further comprising:
a third substrate formed on the polarization member; and
an index matching member formed between the polarization member and the third substrate, the index matching member matching indices of the polarization member and the third substrate.

8. The display panel of claim 7, wherein the index matching member comprises at least one of a resin or an optically clear adhesive (OCA).

9. A display device having a touch-sensitive display panel for sensing a touch, the display panel comprising:
a first substrate including light emitting structures;
a second substrate formed on the first substrate;
a touch sensing structure formed in a display region of the second substrate;
a touch sensing structure control circuit unit formed in a peripheral circuit region of the second substrate; and
a polarization member formed on the touch sensing structure, the polarization member including a circular polarization layer, wherein the slow axis of the circular polarization layer is perpendicular to the direction in which the polarization member and the touch sensing structure control circuit unit are arranged.

10. The display device of claim 9, wherein the touch sensing structure comprises:
a plurality of first touch sensing electrodes arranged parallel to one another; and
a plurality of second touch sensing electrodes arranged along a direction perpendicular to the first touch sensing electrodes.

11. The display device of claim 9, wherein the touch sensing structure control circuit unit comprises:
a film formed on the second substrate; and
a touch control circuit formed on the film,
wherein the touch sensing structure control circuit unit is configure to determine a location of a touch input at least partially based on signals from the touch sensing structure.

12. The display device of claim 9, wherein the polarization member further comprises a linear polarization layer formed on the circular polarization layer, the linear polarization layer having an absorption axis inclined relative to the slow axis by an angle of about 45 degrees.

13. The display device of claim 12,
wherein the linear polarization layer absorbs an incident light along a direction in parallel with the absorption axis,
wherein the circular polarization layer allows a first portion of a light passed through the linear polarization layer to pass the circular polarization layer,
wherein the circular polarization layer allows a phase of a second portion of the light to be delayed by about 90 degrees so that the circular polarization layer absorbs a light reflected from a surface of the first substrate or a surface the second substrate, and
wherein the second portion of the light is perpendicular to the first portion of the light.

14. The display device of claim 9, wherein the display panel further comprises:
a driving circuit unit formed on the first substrate;
a third substrate formed on the polarization member; and
an index matching member formed between the polarization member and the third substrate and configured to match indices of the polarization member and the third substrate.

15. The display device of claim 14, wherein the index matching member comprises at least one of a resin or an optically clear adhesive.

16. A method of manufacturing a display device, comprising:
forming light emitting structures on a first substrate;
providing a second substrate on the first substrate;
forming a touch sensing structure in a display region of the second substrate;
forming a polarization member having a circular polarization layer on the touch sensing structure; and
forming a touch sensing structure control circuit unit in a peripheral circuit region of the second substrate, wherein the circular polarization layer is elongated along a direction perpendicular to the direction in which the polarization member and the touch sensing structure control circuit unit are arranged.

17. The method of claim 16, further comprising forming a driving circuit unit on the first substrate before providing of the second substrate.

18. The method of claim 16, wherein forming the touch sensing structure comprises:
forming a plurality of first touch sensing electrodes arranged parallel to one another; and
forming a plurality of second touch sensing electrodes arranged along a direction perpendicular to the first touch sensing electrodes.

19. The method of claim 16, wherein forming the polarization member further comprises forming a linear polarization layer on the circular polarization layer, the linear polarization layer having an absorption axis inclined to the direction in which the circular polarization layer is elongated by an angle of about 45 degrees.

20. The method of claim 16, further comprising:
forming an index matching member on the polarization member using at least one of a resin or an optically clear adhesive; and
forming a third substrate on the index matching member.

* * * * *